United States Patent [19]
Kitamura et al.

[11] Patent Number: 4,920,692
[45] Date of Patent: May 1, 1990

[54] MULCHING FILM FOR REPELLING INSECT PESTS

[75] Inventors: Shuji Kitamura, Nagaokakyo; Kiyohiko Nakae, Nishinomiya; Kozo Kotani, Toyonaka; Takanori Kume, Takatsuki; Hideo Negawa, Toyonaka, all of Japan

[73] Assignee: Sumitomo Chemical Company, Limited, Osaka, Japan

[21] Appl. No.: 11,035

[22] Filed: Feb. 5, 1987

[30] Foreign Application Priority Data

Aug. 6, 1986 [JP] Japan .................. 61-185853

[51] Int. Cl.$^5$ ............... A01G 7/00; A01G 13/10
[52] U.S. Cl. .............................. 47/9; 47/32
[58] Field of Search .......... 47/56, 9, 74; 524/322, 524/413; 523/126

[56] References Cited

U.S. PATENT DOCUMENTS

| | | | |
|---|---|---|---|
| 3,276,943 | 10/1966 | Kawamura | 47/9 |
| 3,320,695 | 5/1967 | Moore | 47/9 |
| 3,592,792 | 7/1971 | Newland et al. | 47/9 |
| 3,775,147 | 11/1973 | Ferm | 47/9 |
| 3,896,585 | 7/1975 | Miller et al. | 47/9 |
| 3,981,856 | 9/1976 | Hudgin et al. | 523/126 |
| 4,214,034 | 7/1980 | Kodero et al. | 47/9 |
| 4,336,668 | 6/1982 | Decker | 47/56 |
| 4,346,149 | 8/1982 | Sullivan | 428/516 |
| 4,381,333 | 4/1983 | Stewart et al. | 428/428 |
| 4,518,280 | 5/1985 | Fletcher | 47/9 |
| 4,519,181 | 5/1985 | Gilead et al. | 47/9 |
| 4,550,134 | 10/1985 | Iogai et al. | 524/413 |

FOREIGN PATENT DOCUMENTS

| | | | |
|---|---|---|---|
| 1112597 | 3/1956 | France. | |
| 61581 | 5/1977 | Japan | 47/9 |
| 52-84 | 1/1978 | Japan | 47/9 |
| 117547 | 10/1978 | Japan | 47/9 |
| 40146 | 3/1979 | Japan | 47/9 |
| 106589 | 8/1979 | Japan | 47/9 |
| 1041530 | 2/1986 | Japan | 47/9 |
| 1052998 | 12/1966 | United Kingdom. | |
| 1058013 | 2/1967 | United Kingdom. | |
| 1071356 | 6/1967 | United Kingdom. | |
| 2158833A | 11/1985 | United Kingdom. | |

Primary Examiner—Danton D. DeMille

[57] ABSTRACT

A mulching film which comprises a reflective film layer having a reflective peak at a wavelength of less than 0.4 μm and a reflective spectrum having not less than 1.4 of a ratio ($R_A/R_B$) of the ultraviolet peak reflectance ($R_A$) and the visible light reflectance at a wavelength of 0.5 μm ($R_B$) and a black film layer, which is effective for repelling insect pests harmful for various crops and other plants by covering ground for plantation and for lowering of the underground temperature and also for the prevention of the propagation of weeds.

17 Claims, 3 Drawing Sheets

MULCHING FILM FOR REPELLING INSECT PESTS

The present invention relates to a mulching film for repelling insect pests which is effective for repelling insect pests harmful to various crops and other plants by covering the grounds for plantation in the summer season and for promoting the lowering of the underground temperature and for preventing the propagation of weeds. More particularly, the present invention relates to a mulching laminate film which comprises a reflective film layer having a reflective peak at a wavelength of less than 0.4 µm and a reflective spectrum having not less than 1.4 of a ratio ($R_A/R_B$) of the ultraviolet peak reflectance ($R_A$) and the visible light reflectance at a wavelength of 0.5 µm ($R_B$), and a black film layer containing carbon black, etc.

BACKGROUND OF THE INVENTION

A mulching film is usually used for the purpose of maintaining moisture in soil, raising underground temperature and the prevention of a loss of fertilizer components, and so on. The mulching in the summer season is effective for the maintenance of moisture in soil and the prevention of a loss of fertilizer components, but the underground temperature is unfavorably increased, which is not desirable for plant plantation. This increased underground temperature causes the problem of a significant propagation of weeds.

The most popular mulching film is a transparent polyethylene film, but when this mulching film is used in the summer season, due to the transmission of sunlight, the underground temperature becomes too high, and weeds propagate too significantly. Thus it is not suitable for crop culture. Although a black mulching film is effective for the inhibition of weeds, it absorbs sunlight well, which causes a raising of the underground temperature, and is not suitable for thus this type of film the lowering of the underground temperature.

To improve the above drawbacks, it has been proposed to use, as a mulching film suitable for the summer season, a white mulching film containing titanium dioxide or a silver polyethylene film containing aluminum powder. These mulching films, however, are still not satisfactory for lowering the underground temperature or preventing the propagation of weeds. Thus, a mulching film satisfying both requirements is not presently available.

In some crop cultures, there are used films obtained by depositing with aluminum or by laminating an aluminum foil on a polyethylene film, but when these films are applied to, the aluminum deposition or aluminum foil is occasionally peeled off or oxidized and fall to tatters during use. They are also expensive. Accordingly, these films are not popularly used. Moreover, a white and black laminate mulching film is also proposed (cf. Japanese Utility Model Publication (Kokoku) No. 38369/1980), but it is still insufficient for lowering the underground temperature in the summer season, while it is effective for the prevention of the propagation of weeds.

It is also known that the above mulching films are somewhat effective for the prevention of various insect pests harmful for the crop culture, such as thrips (e.g. *Thrips palmi*), aphides (e.g. *Aphis gossypii*, *Mizus persieae*), fruits flies (e.g. *Zeugodacus cucurbitae*), *Aulacophora femoralis*, etc., but they are not so effective for some insect pests.

SUMMARY OF THE INVENTION

From these viewpoints, the present inventors have intensively sought to develop an improved mulching film suitable for a crop culture in the summer season which is effective for lowering of the underground temperature and the prevention of the propagration of weeds and further for repelling insect pests harmful to crops such as thrips (e.g. *Thrips palmi*), aphides (e.g. *Aphis gossypii*, *Mizus persieae*), etc. The present inventors have found that a film having a reflective peak at a wavelength of less than 0.4 µm and a reflective spectrum having not less than 1.4 of a ratio ($R_A/R_B$) of the ultra violet peak reflectance ($R_A$) and the visible light reflectance at a wavelength of 0.5 µm ($R_B$) is remarkably effective for the prevention of insect pests, and that when the film is laminated with a black film layer containing carbon black etc. which can absorb completely the light from the reflective film, there can be obtained an excellent laminate film which results in lowering of the underground temperature and prevention of the propagation of weeds.

An object of the present invention is to provide an improved mulching film having a specific reflective peak and spectrum effective for the prevention of insect pests. Another object of the present invention is to provide a mulching laminate film comprising a film layer containing a specific compound having specific ultraviolet reflection properties and a black film layer.

A further object of the present invention is to provide a laminate film which is capable of lowering the underground temperature and preventing of the propagation of weeds as well as insect pests-repelling effects. These and other objects and advantages of the present invention will be apparent to those skilled in the art from the following description.

1: A reflective film layer containing an inorganic compound, 2: a black film layer containing carbon black etc. 3: a transmission aperture, 4: a transmission aperture produced by a fusing perforation, 5: a heat sealed area, and 6: an air layer.

Figure 1:
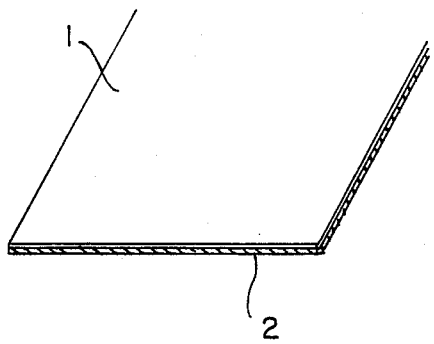
FIG. 1 shows a perspective view of one embodiment of the mulching film of this invention.
Figure 2:
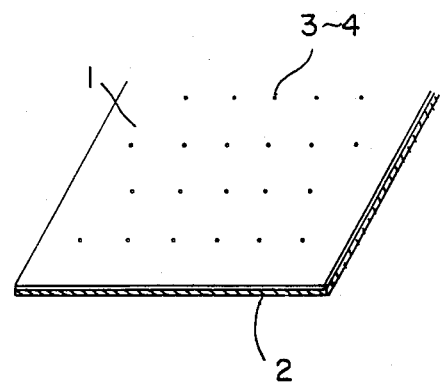
FIG. 2 shows a perspective view of another embodiment of the mulching film of this invention.
Figure 3:
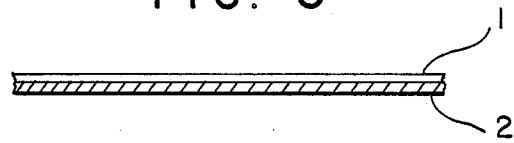
FIGS. 3 to 5 depict cross-sectional views of these mulching films, respectively. In these figures, the symbols mean as follows.
Figure 4:
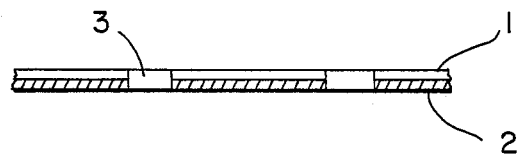
Figure 5:
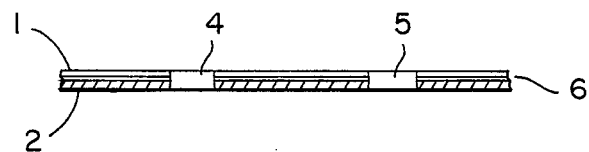
Figure 6A:
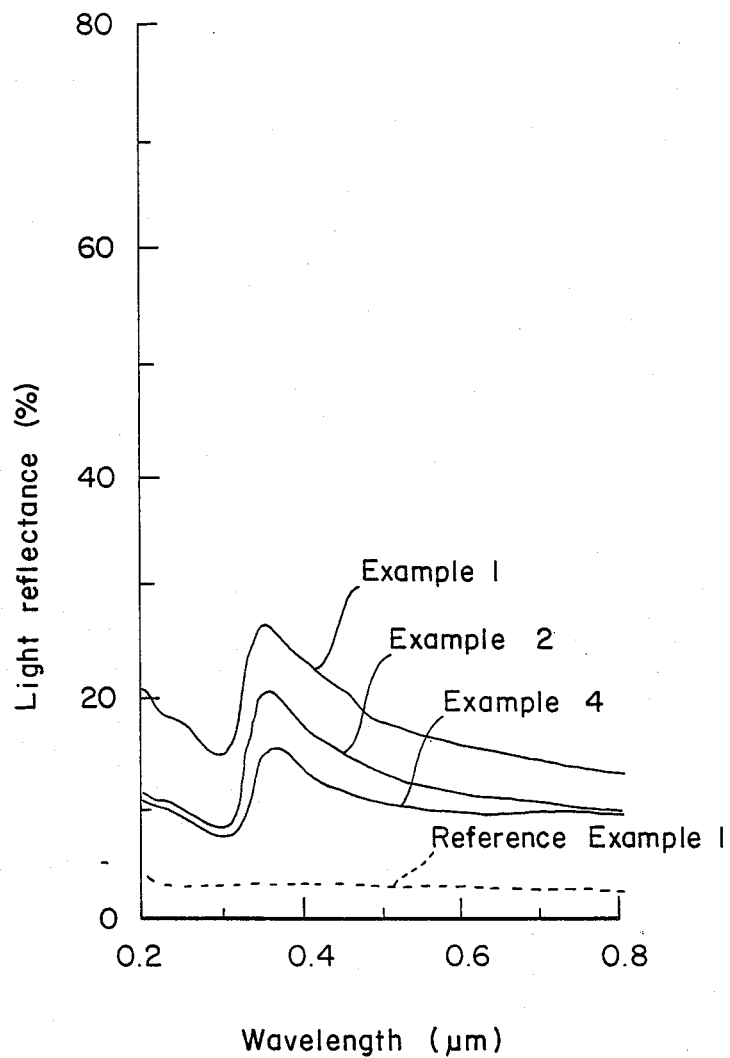
Figure 6B:
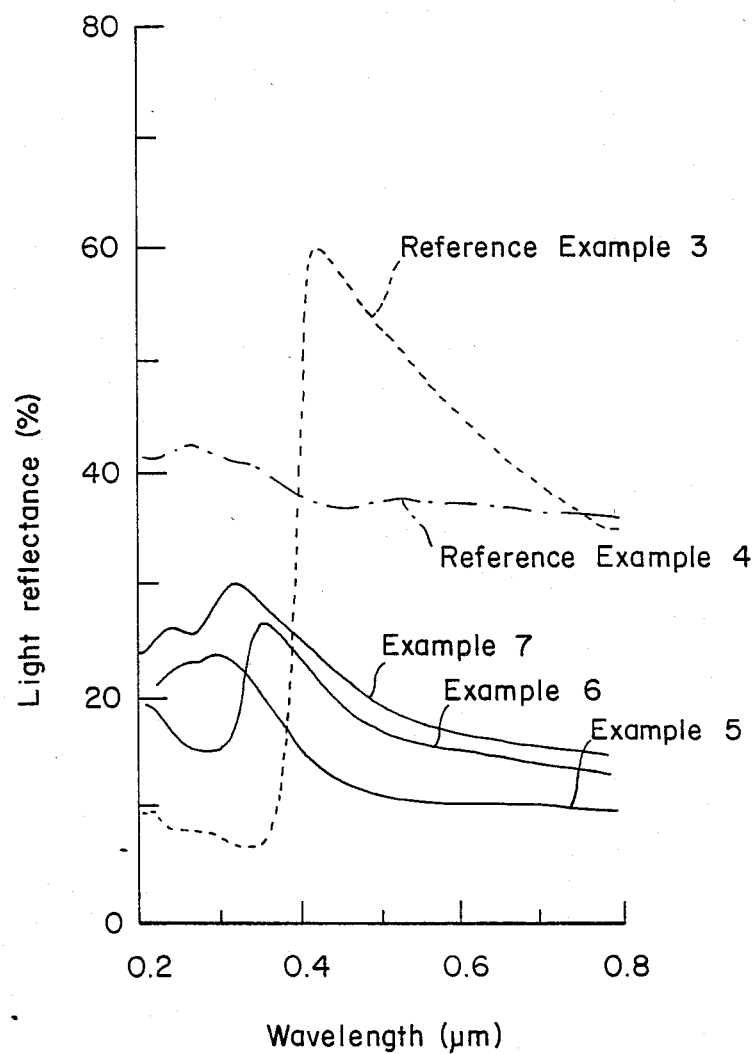

FIG. 6a and FIG. 6b each show a graph of ultraviolet peak reflectance and visible light reflectance respectively at a wavelength of 0.2 to 0.8 µm of the films produced in the Examples of this invention and those in the Reference Examples for comparison.

DETAILED DESCRIPTION OF THE INVENTION

This invention provides a mulching laminate film having an excellent ability for lowering the underground temperature and repelling insect pests, which comprises a reflective film layer having a reflective peak at a wavelength of less than 0.4 µm and a reflective spectrum having not less than 1.4 of a ratio ($R_A/R_B$) of the ultraviolet peak reflectance ($R_A$) and the visible light reflectance at a wavelength of 0.5 μm ($R_B$) and a black film layer containing carbon black, etc.

The starting resin used for the film of this invention includes all kinds of conventional thermoplastic resins. Suitable examples of the resin are ethylene homopolymer or copolymers such as low-density polyethylene, high-density polyethylene, ethylene butene-1 copolymers, ethylene-4-methylpentene-1 copolymers, ethylene-vinyl acetate copolymers, ethylene-acrylic acid copolymers, ethylene methyl methacrylate copolymers, ethylene-vinyl acetate-methyl methacrylate copolymers, ethylene-ethyl acrylate copolymers, etc.; polypropylene; vinyl chloride resins: and the like. These resins may be used alone or in a combination of two or more thereof.

The reflective film layer in this invention can be prepared by incorporating a specific inorganic compound having an ultraviolet reflectance at a wavelength of less than 0.4 μm and a ratio ($n_A/n_B$) of the refractive index of the inorganic compound [$n_A$] and the refractive index of the resin [$n_B$] of not less than 1.2, preferably not less than 1.5. The inorganic compound used in this invention includes any kinds of compound satisfying the above-mentioned conditions, for example, titanate compounds such as potassium titanate, calcium titanate, magnesium titanate, barium titanate, strontium titanate, lithium titanate, etc.; zirconium compounds such as zirconium silicate, zirconium oxide, and the like. Among these compounds, potassium titanate, barium titanate, zirconium silicate and zirconium oxide are particularly preferable in view of the excellent light reflective characteristics of the film and weatherability.

The inorganic compounds may be used in any form of powder or whiskers, but are preferably in the form of whiskers in view of the excellent strength and light reflective characteristics of the film. When the ratio of $R_A/R_B$ is less than the above lower limit, it shows less ability to repell the insect pests.

The resins used in the reflective film layer and the black film layer may be the same or different. The coloring agent for the black film layer is preferably carbon black.

The laminate film of this invention can be prepared, for example, by the following steps.

A thermoplastic resin composition containing an inorganic compound in the form of a powder or whisker is mixed and kneaded with a conventional Banbury mixer, two roll kneader or extruding kneader, where the resin is molten and the inorganic compound etc. are mixed well. The kneaded composition thus prepared and a resin composition containing carbon black etc. are formed into a two layer film by a coextruding film processing method, that is, by extruding them separately from two extruders provided with two layer extruder dies. The two layer film may also be prepared by separately treating an inorganic compound-containing resin composition and a carbon black-containing resin composition with a conventional processing machine as usually used in blown film processing, T-die film processing, calender processing, and the like, or by a two color tubular film processing method, that is, by extruding separately each resin composition from two extruders provided with a specific two color blown film die wherein the half periphery of the film tube is composed of the inorganic compound-containing resin composition and other half thereof is composed of the carbon black-containing resin composition. Among these methods, the two color tubular film processing method is preferred because a step of piling up of the two film layers as mentioned below is not necessary.

The inorganic compound-containing film and the carbon black-containing film as prepared above are piled up and then the films are adhered together by subjecting them to heat sealing or with a hot melt adhesive to give the desired two layer laminate film.

The inorganic compound-containing film and the carbon black-containing film are each preferably made in the most suitable thickness, taking into consideration the economy and also easier handling in working, and is preferably in a thickness of 5 to 35 μm. The whole thickness of the co-extruded or adhered film is preferably in the range of 10 to 75 μm.

The amount of the inorganic compound in the reflective film layer is not specified but may preferably be in the range of 0.5 to 30 % by weight, more preferably 5 to 30 % by weight, based on the whole weight of the inorganic compound-containing film layer in view of high near infrared and ultraviolet reflections. The amount of carbon black etc. used for the black film layer is preferably in the range of 2 to 10 % by weight based on the whole weight of the carbon black-containing film layer in view of complete adsorption of sunlight.

The co-extruded or adhered two layer laminate film preferably has transmission apertures having a diameter of 0.3 to 10 mm and an aperture ratio of 0.1 to 5 %, by which the lowering of the underground temperature is more effectively achieved.

The transmission apertures can be made at the same process line as in the film processing or by separately passing another line for perforation. The apertures can be made by a conventional method, such as punching or needling with hot needles. In the case of an adhered two layer laminate film, the needling with hot needles is preferred because the perforation and adhesion of the area surrounding the apertures can simultaneously be effected. The transmission apertures are preferably formed in a diameter of 0.3 to 10 mm, more preferably 0.5 to 3 mm, and an aperture ratio of 0.1 to 5 %. When the diameter and ratio are lower than the lower limits of the above ranges, the lowering of the underground temperature is not sufficiently effected, and on the other hand, when they are over the upper limits, it exhibits less inhibition of the propagation of weeds, while the lowering of the underground temperature is effected well.

The mulching film of this invention can reflect well the near-infrared rays by the reflective film layer and thereby the raising of the underground temperature is inhibited, and can absorb completely sunlight by the black film layer and can prevent the propagation of weeds. Moreover, the reflective film layer has ultraviolet and visible light reflectivity at a specific wavelength and hence exhibits a repelling effect against various insect pests such as thrips (e.g. *Thrips palmi*), aphides (e.g. *Aphis gossypii, Mizus persieae*), etc., and is particularly useful for a flat land culture of lettuce which is usually cultured at a cool high land in the summer season, and for a culture of cucumber which is cropped both in summer and in autumn, a late raising tomato and spinach.

When the mulching film has transmission apertures, it exhibits an excellent lowering effect of the underground temperature due to the promotion of the permeation of air through the apertures. In the case of the two layer laminate film prepared by heat sealing method or needling with hot needles, an intermediate air layer is provided between the two film layers, and hence, the property of lowering of the underground temperature is more improved more in comparison with the two layer film prepared by a co-extrusion method.

The present invention is illustrated by the following examples and reference examples but should not be construed to be limited thereto.

In the examples and reference examples, the measurement of the underground temperature, propagation of weeds, and insect pests-repelling tests were carried out in the following manner.

A mulching of the film was applied onto a ridge (width: 1 m, length: 10 m, height: 20 cm). A thermometer was set at 5 cm depth from the surface of ground in order to measure the underground temperature.

After 30 days from the mulching, the state of the propagation of weeds was observed by checking the state of weeds on the ridge.

The insect pests-repelling effect was measured by counting the number of *Thrips palmi* or *Aphis gossypii*, (per 40 leaves) in culture of kidney beans for 30 days within the mulching.

EXAMPLE 1

A mixture of an ethylene-butene-1 copolymer [density: 0.921 g/cm$^3$, melt index (MI): 2 g/10 min., refractive index ($n_B$) 1.51] (100 parts by weight), potassium titanate whisker (Tismo® D, K$_2$O·6TiO$_2$, manufactured by Otsuka Kagaku K.K., refractive index ($n_A$:) 2.4) (20 parts by weight) and glycerine monostearate (as a dispersing agent) (0.3 part by weight) is kneaded with a 5 liter Banbury mixer at a resin temperature of 150–160° C. for 10 minutes and then extruded with an extruder to prepare granular pellets (the resulting composition is hereinafter referred to as "Resin Composition A").

The same ethylene-butene-1 copolymer (100 parts by weight) as used above, carbon black (5 parts by weight) and glycerin monostearate (as a dispersing agent) (0.1 part by weight) are kneaded and extruded in the same manner as described above. The resulting granular pellets are referred to as "Resin Composition B".

The Resin Composition A and Resin Composition B obtained above are separately processed with a two layer blown film processing machine provided with two extruders and two layer dies under the conditions of a melting zone of 220° C. and a die temperature of 200° C. wherein the Resin Composition A and Resin Composition B are molten and adhered within the two layer dies to give a two layer laminate film. The film thus obtained has a thickness ratio of Resin Composition A/Resin Composition B layers of 1/1, a total thickness of 30 μm. The film has a ratio ($R_A/R_B$) of an ultraviolet peak reflectance ($R_A$) and a refrectance at wavelength of 0.5 μm ($R_B$) of 1.71.

The physical properties and activities of the film were tested wherein the laminate film was set so that the layer of the Resin Composition A became outside. The results are shown in Table 1.

EXAMPLE 2

In the same manner as described in Example 1 except that a low density polyethylene (density: 0.923 g/cm$^3$, MI: 1.5 g/10 min., refractive index ($n_B$) 1.51, 100 parts by weight), potassium titanate whisker (Tismo® D, K$_2$O·6TiO$_2$, manufactured by Otsuka Kagaku K.K., refractive index ($n_A$): 2.4, 10 parts by weight) and glycerin monostearate (as a dispersing agent, 0.3 part by weight) are kneaded and pelletized, there are obtained granular pellets (Resin Composition C). By using the same low-density polyethylene, carbon black and glycerin monostearate, granular pellets (Resin Composition D) are prepared likewise. The Resin Compositions C and D are treated by two layer blown film processing in the same manner as in Example 1 to prepare a two layer film.

The physical properties and activities of the film were tested, and the results are shown in Table 1.

EXAMPLE 3

The two layer film as prepared in Example 2 is perforated with hot needles to give a two layer perforated film having an aperture diameter of 1.5 mm and an aperture ratio of 0.2 %.

The physical properties and activities of the film were tested, and the results are shown in Table 1.

EXAMPLE 4

Ethylene-butene-1 copolymer [density: 0.921 g/cm$^3$, MI: 2 g/10/min., refractive index ($n_B$): 1.51) (100 parts by weight), potassium titantate whisker (Tismo® L, K$_2$O·6TiO$_2$, manufactured by Otsuka Kagaku K.K., refractive index ($n_A$): 2.3) (5 parts by weight) and glycerine monostearate (as a dispersing agent) (0.3 part by weight) are extruded with a 5 liter Bumbery mixer at a resin temperature of 150–160° C. for 10 minutes and pelletized with an extruder to give granular pellets (the resulting composition is hereinafter referred to as "Resin Composition E").

The same ethylene-butene-1 copolymer (100 parts by weight) as used above, carbon black (5 parts by weight) and glycerin monostearate (as a dispersing agent) (0.1 part by weight) are kneaded and extruded in the same manner as described above. The resulting granular pellets are referred to as "Resin Composition F".

The Resin Composition E and Resin Composition F obtained above are separately processed with a two color blown film processing machine provided with two extruders and two color dies under the conditions of a melting zone of 220° C. and a die temperature of 200° C. to give a two color film wherein the half periphery of the tubular film is composed of Resin Composition E and the remaining half periphery is composed of Resin Composition F. The film thus obtained has a total thickness of 15 μm.

In the film in the figure, the layer of Resin Composition E and the layer of Resin Composition F are folded at the contacting end line and piled up each other. The film is then perforated with a fusing perforation machine with an aperture ratio of 0.2 % (aperture diameter: 1.5 mmϕ) and the areas surrounding each aperature is heat-sealed to provide a perforated laminate film. In the film thus obtained, the areas surrounding apertures are heat-sealed and other areas are merely piled, and hence, the latter areas include an air layer.

The physical properties and activities of the film were tested. The results are shown in Table 1.

EXAMPLE 5

In the same manner as described in Example 1 except that zirconium silicate (A-PAX®, ZrO$_2$65.7 wt.% and SiO$_2$ 33.3 wt.%, manufactured by Kinsei Kogyo K.K., refractive index ($n_A$): 1.8, 20 parts by weight) is used instead of potassium titanate whiskers, there is obtained a two layer laminate film.

The physical properties and activities of the film were tested, and the results are shown in Table 1.

EXAMPLE 6

In the same manner as described in Example 1 except that powdery potassium titanate having average particle size of 2.5 μm ($K_2O \cdot 6TiO_2$, manufactured by Kubota Tekko K.K., refractive index ($n_A$) 2.4, 20 parts by weight) is used instead of potassium titanate whiskers for preparation of Resin composition A as used in Example 1, there is prepared a two layer film.

The physical properties and activities of the film were tested, and the results are shown in Table 1.

EXAMPLE 7

In the same manner as described in Example 1 except that zirconium oxide (EP zirconium oxide, $ZrO_2$ 99.5 wt.% and $SiO_2$ 0.2 wt.%, manufactured by Daiichi Kigenso Kagaku K.K., 20 parts by weight) is used instead of potassium titanate whiskers for preparation of Resin Composition A, there is prepared a two layer film.

The physical properties and activities of the film were tested, and the results are shown in Table 1.

REFERENCE EXAMPLE 3

In the same manner as described in Example 1 except that powdery titanium dioxide (rutile type, 20 parts by weight) is used instead of potassium titanate used in the preparation of Resin Composition A, there is prepared a two layer laminate film.

The physical properties and activities of the film were tested. The results are shown in Table 1.

REFERENCE EXAMPLE 4

In the same manner as described in Example 1 except that powdery aluminum (20 parts by weight) is used instead of potassium titanate used in the preparation of Resin Composition A, there is prepared a two layer laminate film.

The physical properties and activities of the film were tested. The results are shown in Table 1.

As is clear from Table 1, the mulching films of this invention have superior effects in the inhibition of raising of the underground temperature and insect pests-repelling in comparison with the conventional mulching films, and further, the mulching films of this invention show also an excellent effect for the prevention of the propagation of weeds.

TABLE 1

(Physical properties and activities of films)

| Ex. No. | Light reflective properties | | | | Underground temp.-lowering effect | | | Insect pests-repelling effect | | State of propagation of weeds |
|---|---|---|---|---|---|---|---|---|---|---|
| | Ultraviolet reflective peak wavelength (μm) | Ultraviolet reflectance $R_A$ (%) | Reflectance at wavelength 0.5 μm $R_B$ (%) | $R_A/R_B$ | Minimum temp. (°C.) | Minimum temp. (°C.) | Mean temp. (°C.) | Thrips palmi | Aphis gossypii | |
| Ex. 1 | 0.37 | 29 | 17 | 1.71 | 34.2 | 20.4 | 25.6 | 96 | 106 | Non |
| Ex. 2 | 0.37 | 22 | 13 | 1.69 | 35.4 | 21.0 | 26.3 | 118 | 111 | Non |
| Ex. 3 | 0.37 | 21 | 12 | 1.75 | 33.6 | 19.8 | 24.5 | 115 | 103 | Almost not |
| Ex. 4 | 0.38 | 16 | 10 | 1.60 | 31.8 | 18.9 | 23.0 | 107 | 119 | Almost not |
| Ex. 5 | 0.30 | 23 | 10 | 2.30 | 33.1 | 20.3 | 27.3 | 92 | 97 | Non |
| Ex. 6 | 0.36 | 28 | 16 | 1.75 | 34.2 | 19.9 | 25.2 | 98 | 112 | Non |
| Ex. 7 | 0.32 | 32 | 19 | 1.68 | 33.8 | 19.2 | 24.6 | 90 | 105 | Non |
| Ref. Ex. 1 | — | — | — | — | 42.6 | 21.5 | 28.7 | 261 | 258 | Non |
| Ref. Ex. 2 | — | — | — | — | 47.1 | 22.3 | 31.5 | 332 | 234 | Many |
| Ref. Ex. 3 | 0.41 | 63 | 55 | 1.15 | 35.8 | 21.8 | 26.1 | 173 | 218 | Non |
| Ref. Ex. 4 | 0.26 | 41 | 37 | 1.11 | 40.3 | 22.0 | 28.2 | 145 | 193 | Non |
| Control (No mulching) | — | — | — | — | 39.7 | 20.0 | 27.2 | 565 | 611 | Too many propagation |

REFERENCE EXAMPLE 1

By using the Resin Composition B as used in Example 1 alone, there is prepared a single layer film having a thickness of 30 μm by a conventional blown film processing machine.

The physical properties and activities of this film were tested. The results are shown in Table 1.

REFERENCE EXAMPLE 2

By using an ethylene butene 1 copolymer (density: 0.921 g/cm³, MI: 2 g/10 min.), there is prepared a transparent film having a thickness of 30 λm by a conventional blown processing machine.

The physical properties and activities of this film were tested. The results are shown in Table 1.

What is claimed is:

1. A mulching film for lowering underground temperature and repelling insect pests, which comprises a reflective film layer having a reflective peak at a wavelength of less than 0.4 μm and having not less than 1.4 of a ratio ($R_A/R_B$) of the ultraviolet peak reflectance ($R_A$) and the visible light reflectance ($R_B$) at a wavelength of 0.5 μm, and a black film layer with the proviso that said reflective film layer contains a reflective material other than titanium oxide of the rutilated type or aluminum powder.

2. The film according to claim 1, wherein the reflective film layer is a layer of a thermoplastic resin containing an inorganic compound.

3. The film according to claim 2, wherein the inorganic compound is a titanate compound.

4. The film according to claim 3, wherein the titanate compound is a member selected from the group consisting of potassium titanate, calcium titanate, magnesium titanate, barium titanate, strontium titanate, and lithium titanate.

5. The film according to claim 2, wherein the inorganic compound is a zirconium compound.

6. The film according to claim 5, wherein the zirconium compound is a member selected from the group consisting of zirconium silicate and zirconium oxide.

7. The film according to claim 2, wherein the termoplastic resin is a member selected from the group consisting of low-density polyethylene, high-density polyethylene, ethylene-butene-1 copolymers, ethylene-4-methylpentene-1 copolymers, ethylene-vinyl acetate copolymers, ethylene-acrylic acid copolymers, ethylene-methyl methacrylate copolymers, ethylene-vinyl acetate-methyl methacrylate copolymers, ethylene-ethyl acrylate copolymers, polypropylene, vinyl chloride resins, and combinations thereof.

8. The film according to claim 2, wherein the inorganic compound has an ultraviolet reflectance at a wavelength of less than 0.4 μm and a ratio ($N_A N_B$) of the reflective index of the inorganic compound $N_A$ and the reflective index of the resin $N_B$ of at least than 1.2.

9. The film according to claim 8, wherein the ratio ($N_A/N_B$) is at least 1.5.

10. The film according to claim 2, wherein the inorganic compound is in the form of a member selected from the group consisting of powder and whiskers.

11. The film according to claim 2, wherein the amount of the inorganic compound in the reflective film layer is in the range of 0.5 to 30% by weight based on the total weight of the reflective layer.

12. The film according to claim 1, which is a laminate film having transmission apertures of an aperture diameter of 0.3 to 10 mm and a percentage of aperture area to the total area of the film being between 0.1 to 5%.

13. The film according to claim 1, which is an adhered two layer laminate film comprising a reflective film layer of a resin composition containing an inorganic compound and a black film layer and having transmission apertures of an aperture diameter of 0.3 to 10 mm and a percentage of aperture area to the total area of the film being between 0.1 to 5% which is prepared by subjecting a film obtained by piling up the reflective film layer and the black film layer to a fusing perforation, said adhered film being adhered at the area surrounding the apertures and having an intermediate air layer at the other area.

14. The film according to claim 13, which has a thickness in the range of 10 to 75 μm.

15. The film according to claim 13, wherein the transmission apertures are formed in a diameter of 0.5 to 3 mm.

16. The film according to claim 1, wherein the black film layer contains a coloring agent of carbon black.

17. The film according to claim 16, wherein the amount of carbon black is in the range of 2 to 10% by weight based on the whole weight of the black film layer.

* * * * *